(12) United States Patent
Son et al.

(10) Patent No.: US 12,490,281 B2
(45) Date of Patent: Dec. 2, 2025

(54) METHOD AND DEVICE FOR SIDELINK COMMUNICATION BASED ON DRX

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Hyuk Min Son, Iksan-si (KR); Gene Back Hahn, Hwaseong-si (KR); In Yong Jung, Hwaseong-si (KR)

(73) Assignees: Hyundai Motor Company, Seoul (KR); Kia Corporation, Seoul (KR); Wonkwang University Center For Industry-Academy Cooperation, Iksan-si (KR)

( * ) Notice: Subject to any disclaimer, the term of this patent is extended or adjusted under 35 U.S.C. 154(b) by 486 days.

(21) Appl. No.: 18/016,610

(22) PCT Filed: Jul. 19, 2021

(86) PCT No.: PCT/KR2021/009265
§ 371 (c)(1),
(2) Date: Jan. 17, 2023

(87) PCT Pub. No.: WO2022/025504
PCT Pub. Date: Feb. 3, 2022

(65) Prior Publication Data
US 2023/0337259 A1 Oct. 19, 2023

Related U.S. Application Data

(60) Provisional application No. 63/059,474, filed on Jul. 31, 2020.

(51) Int. Cl.
*H04W 72/25* (2023.01)
*H04W 76/28* (2018.01)
(Continued)

(52) U.S. Cl.
CPC ........... *H04W 72/25* (2023.01); *H04W 76/28* (2018.02); *H04W 68/00* (2013.01); *H04W 92/18* (2013.01)

(58) Field of Classification Search
CPC ........... H04L 5/0048; H04L 5/005–12; H04W 68/00; H04W 72/02; H04W 72/0446;
(Continued)

(56) References Cited

U.S. PATENT DOCUMENTS

| 2020/0092845 A1 | 3/2020 | Cai et al. |
| 2020/0229171 A1 | 7/2020 | Khoryaev et al. |
| 2021/0152992 A1* | 5/2021 | Balasubramanian ........ H04W 72/02 |

FOREIGN PATENT DOCUMENTS

| WO | 2017/192018 A1 | 11/2017 |
| WO | 2018/208114 A1 | 11/2018 |

OTHER PUBLICATIONS

International Search dated Oct. 22, 2021 issued in International Patent Application No. PCT/KR2021/009265 (with English translation).
(Continued)

*Primary Examiner* — Thomas R Cairns
(74) *Attorney, Agent, or Firm* — Morgan Lewis & Bockius LLP

(57) ABSTRACT

Disclosed are a method and device for sidelink communication based on DRX. A method for operating a transmission terminal comprises the steps of: performing a sensing operation in a paging resource area; transmitting an SCI to one or more reception terminals in the paging resource area when
(Continued)

the paging resource area is available, wherein the SCI is for scheduling the transmission of a paging message; and transmitting the paging message to the one or more reception terminals by using a resource indicated by the SCI.

20 Claims, 8 Drawing Sheets

(51) Int. Cl.
*H04W 68/00* (2009.01)
*H04W 92/18* (2009.01)

(58) Field of Classification Search
CPC . H04W 72/0453; H04W 72/20; H04W 72/25; H04W 72/40; H04W 76/14; H04W 76/28; H04W 92/18; Y02D 30/70
See application file for complete search history.

(56) References Cited

OTHER PUBLICATIONS

Ericsson (Rapporteur), Introduction of RRC Positioning, R2-2005890, 3GPP TSG-RAN WG2 #110-e, Online Jun. 15, 2020, pp. 1-820.

* cited by examiner

[FIG. 1]

[FIG. 3]
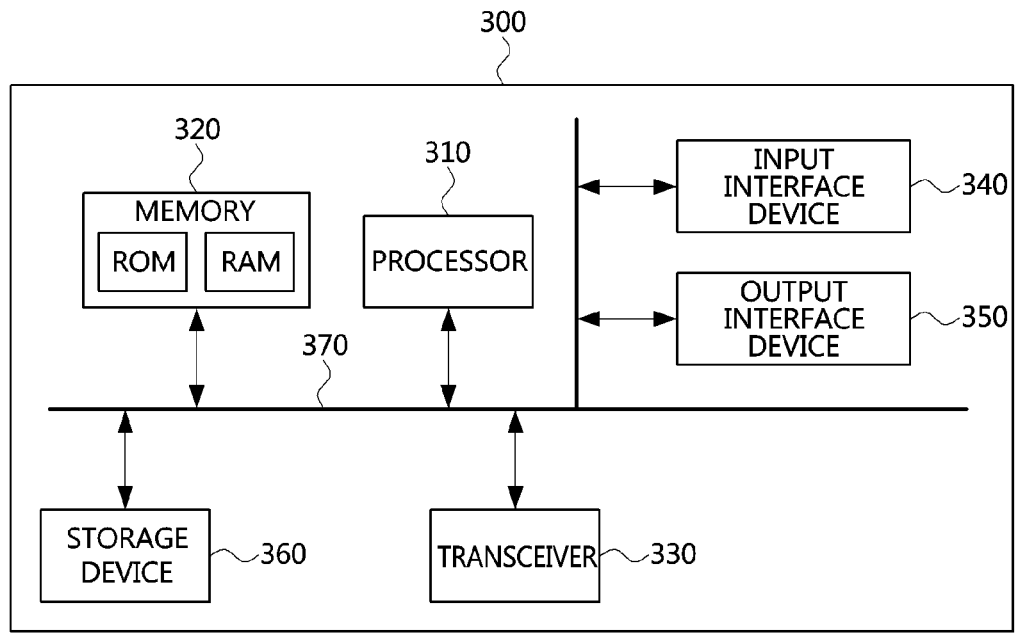
[FIG. 4]
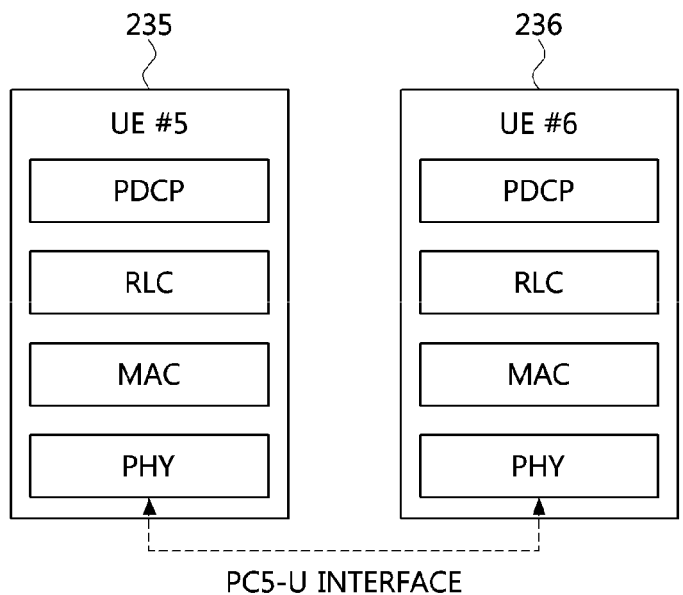

[FIG. 5]
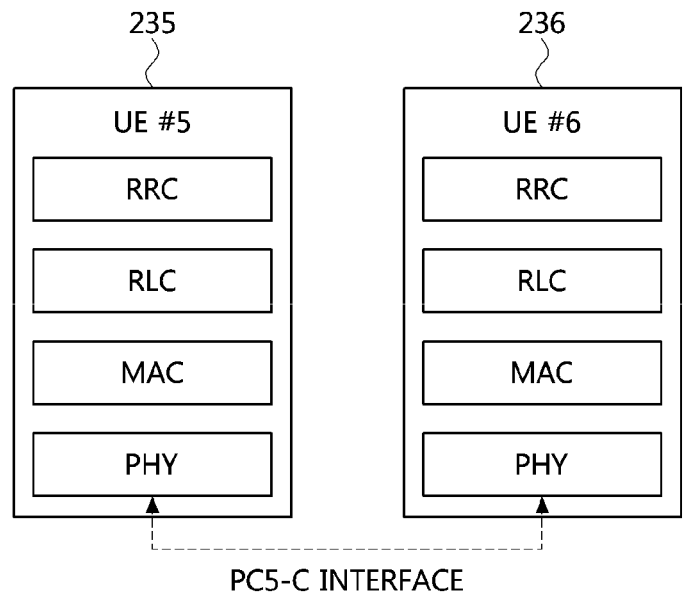
[FIG. 6]
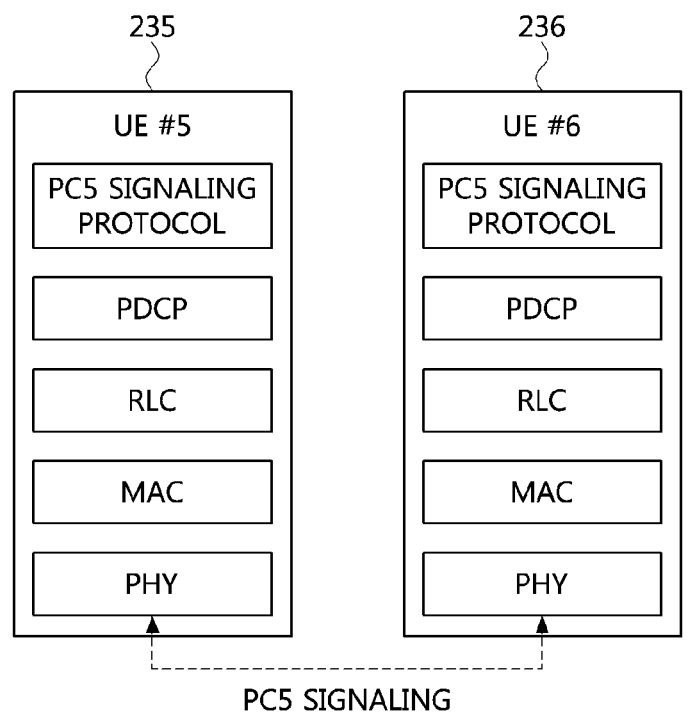

[FIG. 7]
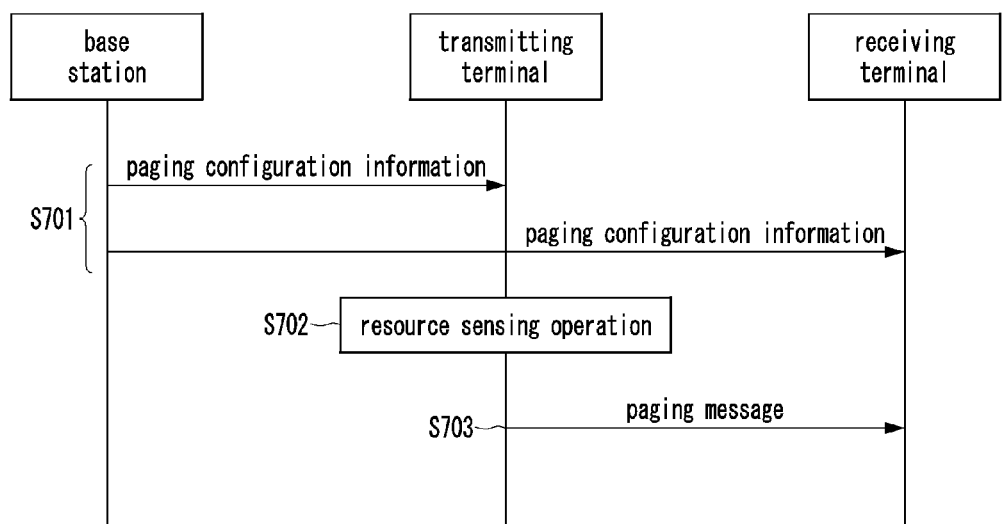

FIG. 8

| time resource pattern #1 | 1 | 0 | 0 | 0 | 0 | 0 | 0 | 0 | 0 | 1 |
|---|---|---|---|---|---|---|---|---|---|---|
| slot: | #0 | #1 | #2 | #3 | #4 | #5 | #6 | #7 | #8 | #9 |

| time resource pattern #2 | 1 | 1 | 0 | 0 | 0 | 0 | 0 | 0 | 0 | 0 |
|---|---|---|---|---|---|---|---|---|---|---|
| slot: | #0 | #1 | #2 | #3 | #4 | #5 | #6 | #7 | #8 | #9 |

| time resource pattern #3 | 0 | 0 | 0 | 0 | 0 | 0 | 0 | 0 | 1 | 1 |
|---|---|---|---|---|---|---|---|---|---|---|
| slot: | #0 | #1 | #2 | #3 | #4 | #5 | #6 | #7 | #8 | #9 |

[FIG. 9]
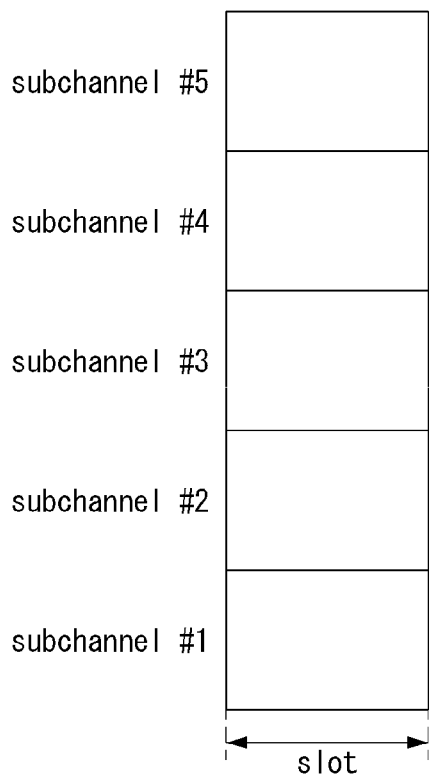
[FIG. 10]
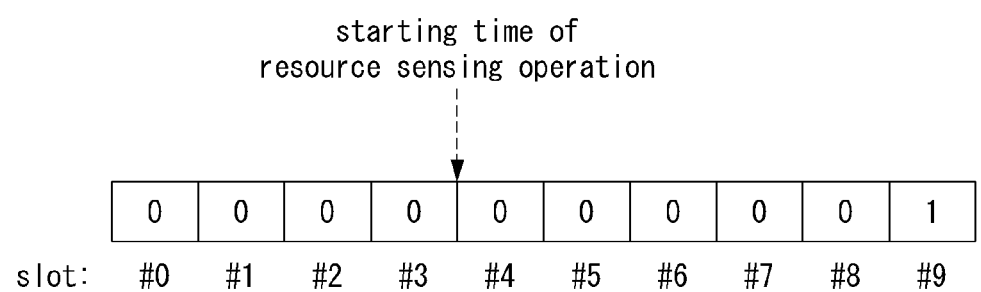

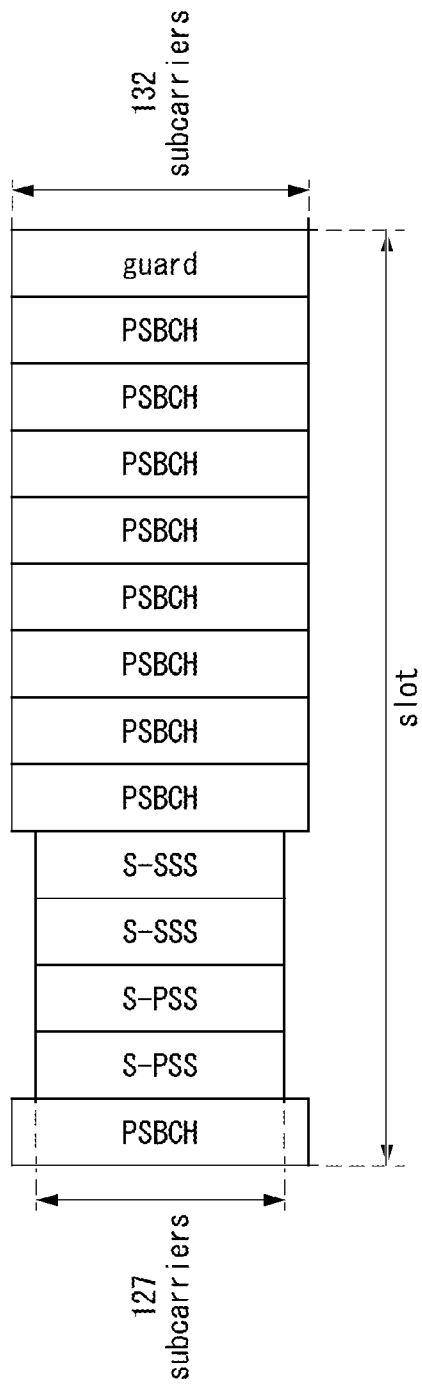

METHOD AND DEVICE FOR SIDELINK COMMUNICATION BASED ON DRX

CROSS-REFERENCE OF RELATED APPLICATIONS

This application is the U.S. National Phase under 35 U.S.C. § 371 of International Patent Application No. PCT/KR2021/009265, filed on Jul. 19, 2021, which in turn claims the benefit of U.S. Provisional Patent Application No. 63/059,474, filed on Jul. 31, 2020, the entire disclosures of which applications are incorporated by reference herein.

TECHNICAL FIELD

The present disclosure relates to a sidelink communication technique, and more particularly, to a sidelink communication technique based on discontinuous reception (DRX).

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, sidelink communication may be performed based on a discontinuous reception (DRX) scheme. That is, a transmitting terminal and/or a receiving terminal may operate based on the DRX scheme. When data to be transmitted to the receiving terminal exists in the transmitting terminal, the transmitting terminal may transmit a paging message to the receiving terminal, and may transmit the data to the receiving terminal after transmitting the paging message. When a resource allocation mode 2 is used, the receiving terminal may continuously perform a reception operation of a paging message because it does not know through which resource the paging message is transmitted. In this case, power consumption of the receiving terminal may increase.

DISCLOSURE

Technical Problem

An objective of the present disclosure for solving the above-described problem is to provide a method and an apparatus for paging in sidelink communication supporting the DRX scheme.

Technical Solution

An operation method of a transmitting terminal, according to a first exemplary embodiment of the present disclosure for achieving the objective, may comprise: performing a sensing operation in a paging resource region; in response to that the paging resource region is available, transmitting sidelink control information (SCI) for scheduling transmission of a paging message to one or more receiving terminals in the paging resource region; and transmitting the paging message to the one or more receiving terminals using a resource indicated by the SCI.

The operation method may further comprise receiving, from the base station, paging configuration information including information indicating the paging resource region, wherein the paging configuration information is included in at least one of system information or a radio resource control (RRC) message.

The paging configuration information may further include a sidelink-paging-radio network temporary identifier (SL-P-RNTI), and the SCI may be transmitted using the SL-P-RNTI.

The sensing operation may be performed in a slot before n slots from the paging resource region, and information on n may be included in at least one of system information or an RRC message transmitted from the base station.

The paging resource region may include a time resource region, the time resource region may be indicated by a bitmap or a combination of a start index and number of time resources, and a unit of the time resource may be a symbol, slot, subframe, or radio frame.

The paging resource region may include a frequency resource region, the frequency resource region may be indicated by a bitmap or a combination of a start index and number of frequency resources, and a unit of the frequency resource may be a subcarrier, physical resource block (PRB), or subchannel.

The paging resource region may be a guard symbol within a slot in which a sidelink-synchronization signal block (S-SSB) is transmitted.

The paging message may include an identifier of one receiving terminal, an identifier of a group including a plurality of receiving terminals, or an identifier of a zone to which at least one receiving terminal belongs.

The paging message may be transmitted as being included in second-stage SCI or transmitted independently of second-stage SCI.

An operation method of a receiving terminal, according to a second exemplary embodiment of the present disclosure for achieving the objective, may comprise: receiving paging configuration information from a base station; performing a monitoring operation to receive sidelink control information (SCI) in a paging resource region indicated by the paging configuration information; and in response to receiving the SCI from a transmitting terminal, receiving a paging message from the transmitting terminal through a resource indicated by the SCI.

The paging configuration information may further include a sidelink-paging-radio network temporary identifier (SL-P-RNTI), and the SCI may be received using the SL-P-RNTI.

The paging resource region may include a time resource region, the time resource region may be indicated by a bitmap or a combination of a start index and number of time resources, and a unit of the time resource may be a symbol, slot, subframe, or radio frame.

The paging resource region may include a frequency resource region, the frequency resource region may be indicated by a bitmap or a combination of a start index and number of frequency resources, and a unit of the frequency resource may be a subcarrier, physical resource block (PRB), or subchannel.

The paging resource region may be a guard symbol within a slot in which a sidelink-synchronization signal block (S-SSB) is transmitted.

The paging message may include an identifier of one receiving terminal, an identifier of a group including a plurality of receiving terminals, or an identifier of a zone to which at least one receiving terminal belongs.

The paging message may be received as being included in second-stage SCI or received independently of second-stage SCI.

A transmitting terminal, according to a third exemplary embodiment of the present disclosure for achieving the objective, may comprise: a processor; and a memory storing one or more instructions executable by the processor, wherein the one or more instructions are executed to: performing a sensing operation in a paging resource region; in response to that the paging resource region is available, transmitting sidelink control information (SCI) for scheduling transmission of a paging message to one or more receiving terminals in the paging resource region; and transmitting the paging message to the one or more receiving terminals using a resource indicated by the SCI.

The one or more instructions may be further executed to perform: receiving, from the base station, paging configuration information including information indicating the paging resource region, wherein the paging configuration information is included in at least one of system information or a radio resource control (RRC) message.

The paging resource region may include a time resource region and a frequency resource region, the time resource region may be indicated by a bitmap or a combination of a start index and number of time resources, a unit of the time resource may be a symbol, slot, subframe, or radio frame, the frequency resource region may be indicated by a bitmap or a combination of a start index and number of frequency resources, and a unit of the frequency resource may be a subcarrier, physical resource block (PRB), or subchannel.

The paging resource region may be a guard symbol within a slot in which a sidelink-synchronization signal block (S-SSB) is transmitted.

Advantageous Effects

According to the present disclosure, paging resource region(s) in which sidelink control information (SCI) for paging message transmission is transmitted may be configured. The transmitting terminal may transmit the SCI in an available paging resource region, and the receiving terminal may perform a monitoring operation for reception of the SCI in the paging resource region. Accordingly, power consumption of the receiving terminal can be reduced, and paging operations can be efficiently performed.

DESCRIPTION OF DRAWINGS

FIG. 3 is a conceptual diagram illustrating an exemplary embodiment of a communication node constituting a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIG. 7 is a sequence chart illustrating a first exemplary embodiment of a paging method for sidelink communication.

FIG. 8 is a conceptual diagram illustrating a first exemplary embodiment of a time resource region indicated by a time resource pattern.

FIG. 9 is a conceptual diagram illustrating a first exemplary embodiment of a frequency resource region indicated by a frequency resource pattern.

FIG. 10 is a conceptual diagram illustrating a start time of a resource sensing operation.

FIG. 11 is a conceptual diagram illustrating a structure of an S-SSB for which a normal cycle prefix (CP) is used.

FIG. 12 is a conceptual diagram illustrating a first exemplary embodiment of a paging resource region.

MODES OF THE INVENTION

Figure 1:
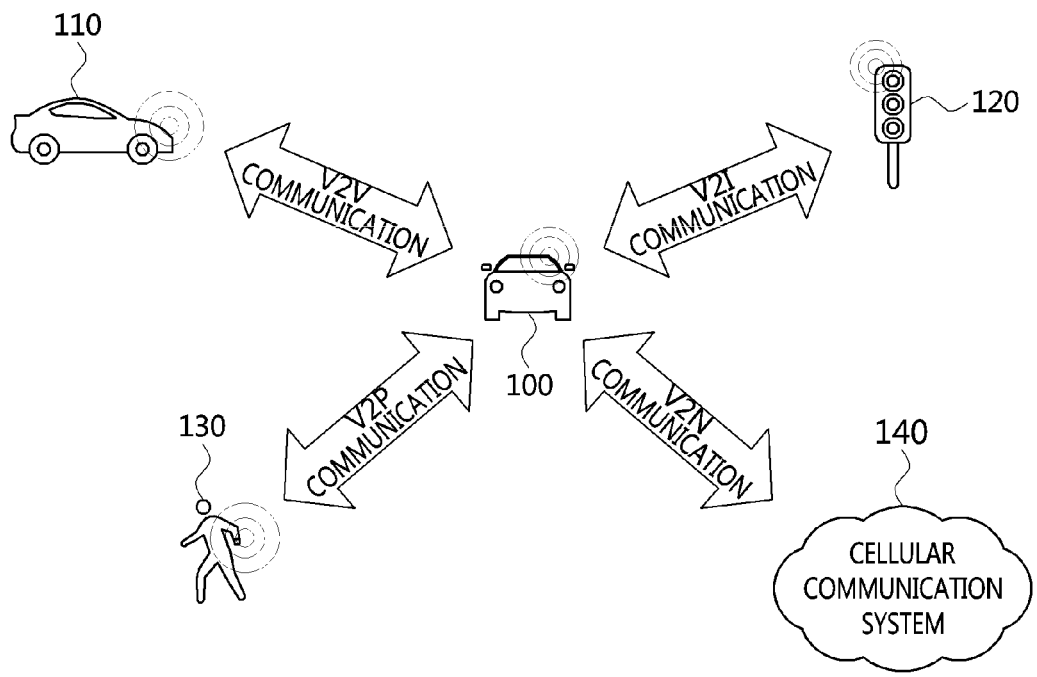
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
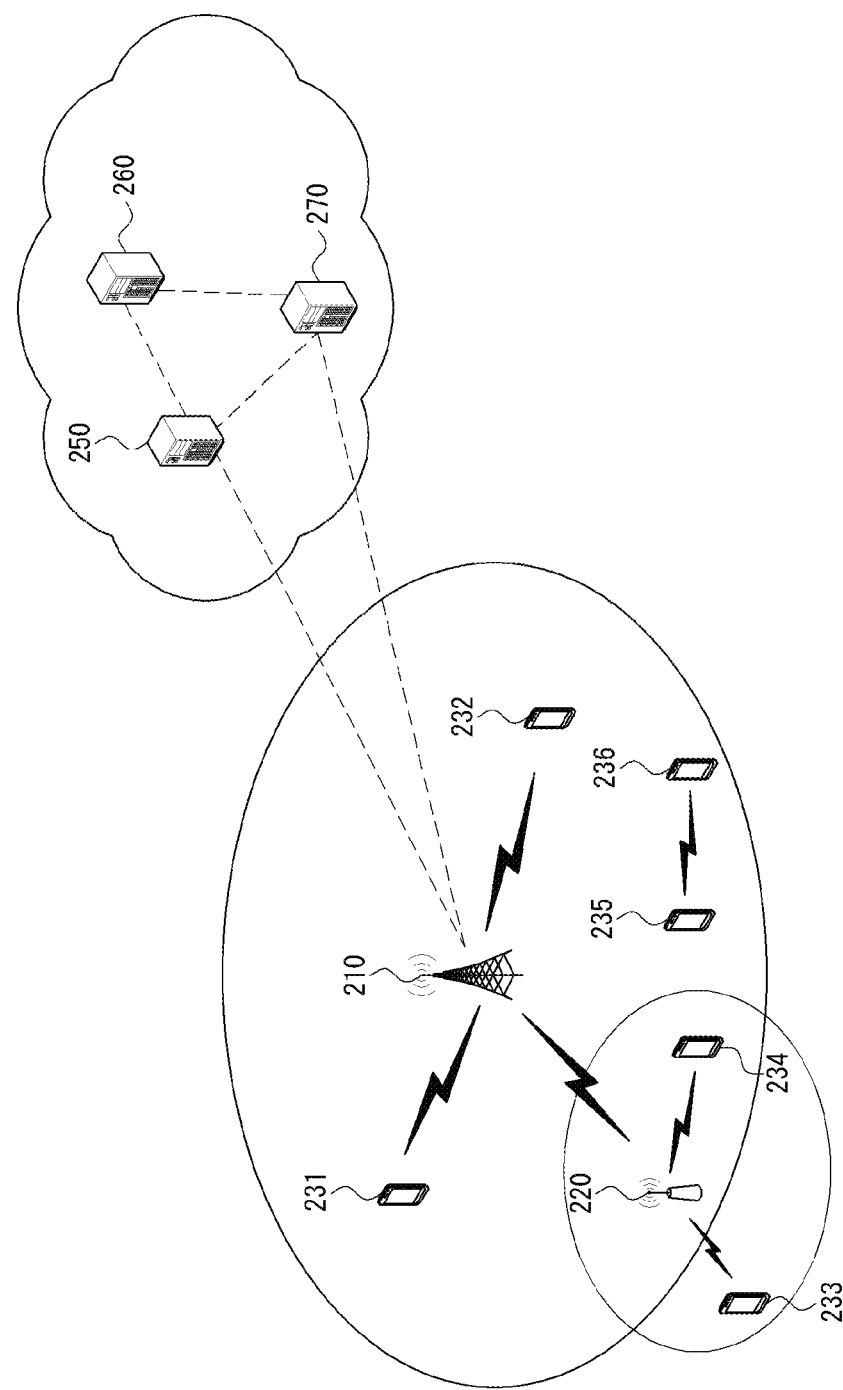
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Hereinafter, sidelink communication methods based on DRX operations will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

Meanwhile, sidelink communication may be performed based on the DRX scheme. That is, a transmitting terminal and/or a receiving terminal may operate based on the DRX scheme. In exemplary embodiments, the transmitting terminal may mean a terminal transmitting data (e.g., sidelink data), and the receiving terminal may mean a terminal receiving the data (e.g., sidelink data). When the resource allocation mode 2 (e.g., sidelink TM 2 or sidelink TM 4 defined in Table 2) is used in sidelink communication, the transmitting terminal may select a resource that can be used for transmission of a paging message by performing a resource sensing operation. The receiving terminal may not know information on the resource selected by the transmitting terminal. Accordingly, the receiving terminal operating in an RRC idle state or a sleep mode may continuously perform an operation for receiving a paging message. When the operation for receiving a paging message is continuously performed, power consumption of the receiving terminal may increase. In order to solve the above-described problems, a resource sensing operation for paging message transmission and an efficient reception operation of a paging message will be described in the following exemplary embodiments.

In sidelink communication, a paging operation may be used for triggering of an RRC setup (e.g., RRC request and/or RRC connection resumption), change/modification of system information, and/or public warning system (PWS)/earthquake and tsunami warning system (ETWS) notification (e.g., public safety notification). The terminal (e.g., transmitting terminal and/or receiving terminal) may include a radio frequency (RF) transceiver (e.g., the transceiver 330 shown in FIG. 3). When the RF transceiver is in an on state, the terminal may operate in an active mode. When the RF transceiver is in an off state, the terminal may operate in a sleep mode. The terminal operating in the RRC idle state or RRC inactive state may operate in the active mode or the sleep mode according to the state of the RF transceiver. The following exemplary embodiments may be applied to the terminal operating in the active mode or the sleep mode. The paging operation may be performed based on Scheme 1 or Scheme 2 below.

Paging Scheme 1

The transmitting terminal may transmit SCI (e.g., first-stage SCI) for paging message transmission to the receiving terminal(s) on a PSCCH, and transmit a paging message to the receiving terminal(s) on a PSSCH configured by the SCI. Alternatively, the paging message may be transmitted on a PSCCH instead of the PSSCH. In this case, the paging operation may be performed without a PSSCH.

Paging Scheme 2

The transmitting terminal may transmit a wake-up signal to the receiving terminal(s), and may transmit a paging message after transmitting the wake-up signal. The receiving terminal(s) may receive the wake-up signal from the transmitting terminal. When the wake-up signal is received, the receiving terminal(s) may perform a PSCCH monitoring operation in order to receive the paging message. The receiving terminal(s) may perform a PSCCH or PSSCH monitoring operation in a specific resource region through the detection of the wake-up signal.

In exemplary embodiments, the receiving terminal(s) may mean one receiving terminal or a plurality of receiving terminals. In sidelink communication according to the unicast scheme, the paging operation may be performed for one receiving terminal. In sidelink communication according to the broadcast scheme, groupcast scheme, or multicast scheme, the paging operation may be performed for a plurality of receiving terminals.

The receiving terminal(s) operating in the active mode may receive data from the transmitting terminal. After a preset time elapses from a time of receiving the data (e.g., the last data), the receiving terminal(s) may enter the sleep mode. That is, the operation mode of the receiving terminal(s) may transition from the active mode to the sleep mode.

The receiving terminal(s) operating in the RRC connected state may receive data from the transmitting terminal. After a preset time elapses from a time of receiving the data (e.g., the last data), the receiving terminal(s) may enter the RRC idle state. That is, the operation state of the receiving terminal(s) may transition from the RRC connected state to the RRC idle state.

FIG. 7 is a sequence chart illustrating a first exemplary embodiment of a paging method for sidelink communication.

As shown in FIG. 7, the communication system may include a base station, a transmitting terminal and a receiving terminal. For example, the transmitting terminal may be the UE 235 shown in FIG. 2, the receiving terminal may be the UE 236 shown in FIG. 2, and the base station may the base station 210 shown in FIG. 2. Each of the base station, transmitting terminal and receiving terminal may be configured identically or similarly to the communication node 300 shown in FIG. 3. Each of the transmitting terminal and the receiving terminal may support the protocol stacks shown in FIGS. 4 to 6.

The base station may generate paging configuration information for paging in sidelink communication. The paging configuration information may include information indicating a paging resource region. The paging resource region may be configured by the base station. Alternatively, the paging resource region may be preconfigured in the communication system. The paging resource region may include time and frequency resource(s). SCI for paging message transmission (hereinafter referred to as 'paging SCI') and/or a paging message may be transmitted within the paging resource region. The paging SCI may schedule transmission of the paging message. The paging resource region may refer to a resource region in which the receiving terminal attempts to receive the paging SCI and/or the paging message. The paging resource region may be referred to as a 'paging occasion' or 'paging resource pool'.

In addition, the paging configuration information may include a sidelink-paging-radio network temporary identifier (SL-P-RNTI) used for transmission and reception of the paging SCI. A cyclic redundancy check (CRC) of the paging SCI may be scrambled by the SL-P-RNTI. The base station may transmit the paging configuration information to the terminals (e.g., transmitting terminal and/or receiving terminal(s)) by using one or a combination of two or more of system information (e.g., MIB and/or SIB), RRC message (e.g., RRC reconfiguration message and/or RRC setup message), MAC control information (CE), or control information (e.g., DCI) (S701). The transmitting terminal and/or the receiving terminal(s) may receive the paging configuration information from the base station, and may identify the paging resource region and/or SL-P-RNTI indicated by the paging configuration information.

The transmitting terminal and/or receiving terminal(s) may operate according to the DRX scheme. For example, the receiving terminal(s) may operate in the RRC idle state or sleep mode according to the DRX scheme. For example, the receiving terminal(s) operating in the RRC idle state or RRC inactive state may operate in the sleep mode or active mode. When there is data to be transmitted to the receiving terminal(s), the transmitting terminal may perform a resource sensing operation in the paging resource region to transmit a paging message (S702). The resource sensing operation may be used to detect a resource that can be used for transmission of paging SCI and/or a paging message within the paging resource region. For example, the transmitting terminal may identify whether a resource allocated for another terminal, reserved resource, or occupied resource exists within the paging resource region. The transmitting terminal operating in the RRC idle state or the RRC inactive state may transition to the RRC connected state at a specific time before the paging resource region, and the transmitting terminal operating in the RRC connected state may perform the step S702. Alternatively, the transmitting terminal operating in the sleep mode may transition to the active mode at a specific time before the paging resource region, and the transmitting terminal operating in the active mode may perform the step S702. The transmitting terminal operating in the active mode may mean the transmitting terminal operating in the RRC connected state.

The transmitting terminal may select all or some resources from available resources detected by the resource sensing operation. The transmitting terminal may transmit the paging message to the receiving terminal(s) using the selected resources (S703). The step S703 (e.g., paging message transmission operation) may include a transmission operation of the paging SCI and a transmission operation of the paging message scheduled by the paging SCI. The paging message may be included in second-stage SCI associated with first-stage SCI (e.g., the paging SCI). In this case, 'transmission of the first-stage SCI (e.g., paging SCI)

→transmission of the second-stage SCI (e.g., paging message) associated with the first-stage SCI→transmission of data (e.g., paging data) scheduled by the first-stage SCI' may be performed. The paging data may be data to be transmitted to the receiving terminal(s), and the paging operation may be performed for transmission of the paging message.

Alternatively, the paging message may be transmitted independently of the second-stage SCI. In this case, 'transmission of the first-stage SCI (e.g., paging SCI)→transmission of the second-stage SCI associated with the first-stage SCI→transmission of data (e.g., paging message) scheduled by the first-stage SCI' may be performed. Alternatively, in the step S703, the paging message may be transmitted without the paging SCI. In this case, the paging message may be transmitted on a PSCCH or PSSCH. In exemplary embodiments, a transmission operation of a paging message may mean a transmission operation of a paging message accompanied by paging SCI or a transmission operation of a paging message not accompanied by paging SCI.

The paging message may include a terminal identifier, a group identifier, or a zone identifier. The paging message including a terminal identifier may be a paging message for one receiving terminal indicated by the corresponding terminal identifier. The paging message including a group identifier may be a paging message for receiving terminal(s) belonging to one group indicated by the corresponding group identifier. The paging message including a zone identifier may be a paging message for receiving terminal(s) belonging to one zone indicated by the corresponding zone identifier.

The receiving terminal(s) may perform a monitoring operation for reception of a paging message in the paging resource region indicated by the paging configuration information. In exemplary embodiments, a reception operation of a paging message may mean a reception operation of a paging message accompanied by paging SCI or a reception operation of a paging message not accompanied by paging SCI. For example, the receiving terminal(s) may perform a reception operation of paging SCI (e.g., first-stage SCI) using the SL-P-RNTI included in paging configuration information. That is, the receiving terminal(s) may receive paging SCI having CRC bits scrambled by the SL-P-RNTI. The receiving terminal(s) operating in the sleep mode may transition to the active mode at a specific time before the paging resource region, and the receiving terminal(s) operating in the active mode may perform a monitoring operation for the paging resource region. The paging resource region may be configured to indicate a sensing time (e.g., monitoring time) of the receiving terminal.

When the paging message is received from the transmitting terminal, the receiving terminal(s) may determine whether the paging message is a paging message for itself based on the identifier (e.g., terminal identifier, group identifier, or zone identifier) included in the paging message. When the received paging message is a paging message for itself, the receiving terminal(s) may perform sidelink communication (e.g., sidelink data reception operation) with the transmitting terminal. The reception operation of the paging message and/or paging data may be 'reception of the first-stage SCI (e.g., paging SCI)→reception of the second-stage SCI (e.g., paging message) associated with the first-stage SCI→reception of the data (e.g., paging data) scheduled by the first-stage SCI' or 'reception of the first-stage SCI (e.g., paging SCI)→reception of the second-stage SCI associated with the first-stage SCI→reception of the data (e.g., paging message) scheduled by the first-stage SCI'.

The paging resource region may be configured as shown in Table 3 below. A plurality of paging resource regions may be configured, and one or more paging resource regions among the plurality of paging resource regions may be activated. The paging operation may be performed using one or more activated paging resource regions. For example, the plurality of paging resource regions may be configured by system information and/or an RRC message, and one or more paging resource regions may be activated by a MAC CE and/or DCI.

TABLE 3

| | Resource pattern | Periodicity (ms) |
|---|---|---|
| Paging resource region #1 | Resource pattern #1 | 80 |
| Paging resource region #2 | Resource pattern #2 | 160 |
| Paging resource region #3 | Resource pattern #3 | 320 |

A resource pattern may include a time resource pattern and/or a frequency resource pattern. A time resource region indicated by the time resource pattern may be configured in units of symbols, slots, subframes, or radio frames. The time resource pattern may be indicated by a bitmap or a combination of an index of a start time resource and the number of time resources. Here, the time resource may be a symbol, slot, subframe, or radio frame.

FIG. 8 is a conceptual diagram illustrating a first exemplary embodiment of a time resource region indicated by a time resource pattern.

As shown in FIG. 8, a bitmap may indicate a time resource pattern. The bitmap may include 10 bits, and each bit in the bitmap may correspond to one slot. A bit set to a first value (e.g., 0) in the bitmap may indicate that a slot corresponding to the bit is not configured as a paging resource region. A bit set to a second value (e.g., 1) in the bitmap may indicate that a slot corresponding to the bit is configured as a paging resource region.

When a time resource pattern #1 is used, the transmitting terminal may perform a resource sensing operation (e.g., step S702 shown in FIG. 7) in a slot #0 and a slot #9, and the receiving terminal(s) may perform a paging message reception operation in the slot #0 and the slot #9. The transmitting terminal may identify whether a paging resource region is available based on SCI(s) received from other terminal(s). Here, the SCI(s) of other terminal(s) may be received before the corresponding paging resource region or in the corresponding paging resource region. Alternatively, the transmitting terminal may compare a measurement result (e.g., reference signal received power (RSRP), reference signal received quality (RSRQ), received signal strength indicator (RSSI)) of a signal received in the paging resource region with a threshold. When the measurement result of the received signal is less than the threshold, the transmitting terminal may determine that the paging resource region can be used. When the measurement result of the received signal is greater than or equal to the threshold, the transmitting terminal may determine that the paging resource region cannot be used. Here, the threshold may be configured to the terminal (e.g., transmitting terminal and/or receiving terminal(s)) through system information, an RRC message, a MAC CE, and/or control information.

The periodicity defined in Table 3 may indicate a configuration periodicity of the resource pattern. For example, when a paging resource region #1 is used, resources according to the resource pattern #1 may be configured at a periodicity of 80 milliseconds (ms). Resources (e.g., slots)

indicated by the paging resource region #1 may belong to a resource pool configured for the transmitting terminal and the receiving terminal(s). That is, the paging resource region may be configured within a resource pool configured for the transmitting terminal and the receiving terminal(s).

Meanwhile, the frequency resource pattern may indicate a specific frequency resource region. A frequency resource region indicated by the frequency resource pattern may be configured in units of subcarriers, physical resource blocks (PRBs), or subchannels. The frequency resource pattern may be indicated by a bitmap, an interlace, or a combination of an index of a start frequency resource and the number of frequency resources. Here, the frequency resource may be a subcarrier, PRB, or subchannel. The bitmap for the frequency resource pattern may be configured in the same manner as or similarly to the bitmap shown in FIG. 8.

The entire specific frequency resource region may be configured using indexes of subcarriers, PRBs, and/or subchannels, and the resource sensing operation (e.g., step S702 shown in FIG. 7) and/or the sensing operation for receiving the paging message in the receiving terminal(s) may be performed in the order of the subcarrier indexes, the PRB indexes, and/or the subchannel indexes. The specific frequency resource region may be configured as a frequency resource region in which a sidelink-synchronization signal block (S-SSB) is transmitted, and the resource sensing operation (e.g., step S702 shown in FIG. 7) and/or the sensing operation for receiving a paging message in the receiving terminal(s) may be performed in the corresponding frequency resource region in the order of the subcarrier indexes, PRB indexes, and/or subchannel indexes. The S-SSB may be referred to as an S-SS/PSBCH block.

FIG. 9 is a conceptual diagram illustrating a first exemplary embodiment of a frequency resource region indicated by a frequency resource pattern.

As shown in FIG. 9, a frequency resource region may be configured in units of subchannels within one slot. For example, the frequency resource region may include subchannels #1 to #5. The resource sensing operation (e.g., step S702 shown in FIG. 7) and/or the sensing operation for receiving a paging message in the receiving terminal(s) may be performed in the order from the subchannel #1 to the subchannel #5 or in the order from the subchannel #5 to the subchannel #1.

FIG. 10 is a conceptual diagram illustrating a start time of a resource sensing operation.

As shown in FIG. 10, a slot #9 may be configured as a paging resource region. In this case, the transmitting terminal may perform a resource sensing operation (e.g., step S702 shown in FIG. 7) in a slot before n slot(s) from the slot #9. For example, when n is 5, the transmitting terminal may perform a resource sensing operation from a slot #4. The transmitting terminal may perform a resource sensing operation before the slot #9 in order to check existence of SCI scheduling the slot #9, which is the paging resource region. n may be configured to the terminal (e.g., transmitting terminal and/or receiving terminal(s)) through system information, an RRC message, a MAC CE, and/or control information. n may be set in units of symbols, slots, subframes, or radio frames.

Meanwhile, the paging resource region may be composed of time resource region(s) and frequency resource region(s). When a first time resource region after a time of attempting paging message transmission is available, the transmitting terminal may perform a paging message transmission operation in the first time resource region. Alternatively, when a plurality of time resource regions are available, the transmitting terminal may select one or more time resource regions from among the plurality of time resource regions according to a specific criterion, and perform a paging message transmission operation in the selected one or more time resource regions. The specific criterion may be a channel busy ratio (CBR) threshold, an RSRP threshold, etc. associated with the time resource region.

When a plurality of frequency resource regions are available in the time resource region, the transmitting terminal may preferentially select a frequency resource region having the lowest subcarrier index, lowest PRB index, or lowest subchannel index among the plurality of frequency resource regions, and may perform a paging message transmission operation using the selected frequency resource region. Alternatively, the transmitting terminal may preferentially select a frequency resource region having the highest subcarrier index, the highest PRB index, or the highest subchannel index among the plurality of frequency resource regions, and may perform a paging message transmission operation using the selected frequency resource region. Alternatively, the transmitting terminal may select one or more frequency resource regions from among the plurality of frequency resource regions according to a specific criterion, and may perform a paging message transmission operation using the selected one or more frequency resource regions. The specific criterion may be a CBR threshold, an RSRP threshold, etc. associated with the frequency resource region.

The transmitting terminal may select a paging resource region (e.g., time resource region and/or frequency resource region) based on a combination and/or extension of the above-described exemplary embodiments. The receiving terminal(s) may perform a reception operation for a paging message in one or more paging resource regions (e.g., time resource region(s) and/or frequency resource region(s)). The receiving terminal(s) may select the paging resource region(s) using the same or similar method as the above-described method of selecting paging resource region(s) (e.g., time resource region(s) and/or frequency resource region(s)) of the transmitting terminal, and may perform a paging message reception operation in the selected paging resource region(s). In this case, the amount of calculation and/or the number of decoding attempts in the receiving terminal(s) may be reduced.

In the step S703 shown in FIG. 7, the paging message transmission operation of the transmitting terminal may be performed in the paging resource region(s) selected by the above-described method, and the paging message reception operation of the receiving terminal may be performed in the paging resource region(s) selected by the above-described method. The paging message may be transmitted on a PSCCH or PSSCH.

Alternatively, the paging message may be transmitted through a guard symbol of an S-SSB.

FIG. 11 is a conceptual diagram illustrating a structure of an S-SSB for which a normal cycle prefix (CP) is used.

As shown in FIG. 11, a paging message may be transmitted in a guard symbol after the last PSBCH. The transmitting terminal may transmit the paging message without performing a resource sensing operation (e.g., step S702 shown in FIG. 7). The paging message may be transmitted on a PSCCH or PSSCH.

In order to wake up the receiving terminal(s) operating in the RRC idle state or sleep mode, it may be possible to transmit a wake-up signal in form of an energy or a sequence using some subcarriers. PSCCH resource allocation for specific subcarrier(s), specific PRB(s), or specific subchannel(s) in a guard symbol may be expressed using an equation to be calculated based on an identifier (ID) of the transmitting terminal and/or ID(s) of the receiving terminal(s). Alternatively, transmission of a specific sequence for specific subcarrier(s), specific PRB(s), or specific subchannel(s) in the guard symbol may be operated based on the ID of the transmitting terminal and/or the ID(s) of the receiving terminal(s).

The receiving terminal(s) performing decoding of a PSCCH in the paging resource region may check whether the PSSCH is a paging message for itself. For example, the receiving terminal(s) may determine whether it is a paging message for itself based on the paging configuration information (e.g., paging configuration information in the step S701 shown in FIG. 7) configured through system information and/or RRC message. When a paging message for itself is received, the operation state of the receiving terminal(s) may transition from the RRC idle state to the RRC connected state.

The receiving terminal(s) detecting the specific sequence may identify whether it is a wake-up signal for itself. For example, the receiving terminal(s) may identify whether it is a wake-up signal for itself based on the paging configuration information (e.g., paging configuration information in the step S701 shown in FIG. 7) configured through system information and/or RRC message. When a wake-up signal for itself is received, the operation mode of the receiving terminal(s) may transition from the sleep mode to the active mode.

Information on the ID (s) of the receiving terminal (s) may be transmitted on a PSSCH. In this case, the transmitting terminal may transmit SCI (e.g., first-stage SCI) on a PSCCH within the guard symbol. The first-stage SCI may include resource allocation information for data transmission or resource allocation information for second-stage SCI and data transmission. The transmitting terminal may transmit a paging message in a resource region (e.g., paging resource region) allocated by the first-stage SCI. The receiving terminal(s) may receive the first-stage SCI from the transmitting terminal on the PSCCH within the guard symbol, and receive the paging message in a resource region (e.g., paging resource region) allocated by the first-stage SCI.

When the PSCCH (e.g., SCI) or wake-up signal for transmission of the paging message is transmitted in the guard symbol, the resource region for transmission of the PSCCH (or paging message) or wake-up signal may be configured in association with S-SSB configuration.

FIG. 12 is a conceptual diagram illustrating a first exemplary embodiment of a paging resource region.

As shown in FIG. 12, a PSCCH (e.g., SCI) or wake-up signal for paging message transmission may be transmitted in a paging resource region. A slot marked with '1' may be a resource region in which an S-SSB is transmitted in an S-SSB period. One S-SSB transmission burst or one S-SSB period may be composed of 10 slots. The S-SSB may be transmitted in slots #0, #2, #4, #6, and #8. A PSCCH (e.g., SCI) or wake-up signal for paging message transmitted may be transmitted in guard symbols in the slots #0, #4, and #8.

A resource region (e.g., paging resource region) in which the PSCCH (e.g., SCI) or wake-up signal for paging message transmission can be transmitted may be configured by system information and/or an RRC message. Information indicating the paging resource region may be a resource index or a bitmap.

When an S-SSB periodicity is set to 160 ms, the transmitting terminal may transmit a PSCCH (e.g., SCI) or wake-up signal for paging message transmission in the paging resource region shown in FIG. 12 within each S-SSB period. The periodicity of the paging resource region may be set in association with the S-SSB periodicity. When the S-SSB periodicity is set to 160 ms and the periodicity of the paging resource region is set to 320 ms, the transmitting terminal may transmit a PSCCH (e.g., SCI) or wake-up signal for paging message transmission through the paging resource region shown in FIG. 12 in the first S-SSB period, and may transmit a PSCCH (e.g., SCI) or wake-up signal for paging message transmission through the paging resource region shown in FIG. 12 in the third S-SSB period. Here, one period of the paging resource region may correspond to two S-SSB periods.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. An operation method of a transmitting terminal in a communication system, the operation method comprising:
   performing a sensing operation in a paging resource region;
   in response to that the paging resource region is available, transmitting sidelink control information (SCI) for scheduling transmission of a paging message to one or more receiving terminals in the paging resource region; and
   transmitting the paging message to the one or more receiving terminals using a resource indicated by the SCI.

2. The operation method according to claim 1, further comprising receiving, from a base station, paging configuration information including information indicating the paging resource region, wherein the paging configuration information is included in at least one of system information or a radio resource control (RRC) message.

3. The operation method according to claim 2, wherein the paging configuration information further includes a sidelink-paging-radio network temporary identifier (SL-P-RNTI), and the SCI is transmitted using the SL-P-RNTI.

4. The operation method according to claim 1, wherein the sensing operation is performed in a slot before n slots from the paging resource region, and information on n is included in at least one of system information or an RRC message transmitted from the base station.

5. The operation method according to claim 1, wherein the paging resource region includes a time resource region, the time resource region is indicated by a bitmap or a combination of a start index and number of time resources, and a unit of the time resource is a symbol, slot, subframe, or radio frame.

6. The operation method according to claim 1, wherein the paging resource region includes a frequency resource region, the frequency resource region is indicated by a bitmap or a combination of a start index and number of frequency resources, and a unit of the frequency resource is a subcarrier, physical resource block (PRB), or subchannel.

7. The operation method according to claim 1, wherein the paging resource region is a guard symbol within a slot in which a sidelink-synchronization signal block (S-SSB) is transmitted.

8. The operation method according to claim 1, wherein the paging message includes an identifier of one receiving terminal, an identifier of a group including a plurality of receiving terminals, or an identifier of a zone to which at least one receiving terminal belongs.

9. The operation method according to claim 1, wherein the paging message is transmitted as being included in second-stage SCI or transmitted independently of second-stage SCI.

10. An operation method of a receiving terminal in a communication system, the operation method comprising:
receiving paging configuration information from a base station;
performing a monitoring operation to receive sidelink control information (SCI) in a paging resource region indicated by the paging configuration information; and
in response to receiving the SCI from a transmitting terminal, receiving a paging message from the transmitting terminal through a resource indicated by the SCI.

11. The operation method according to claim 10, wherein the paging configuration information further includes a sidelink-paging-radio network temporary identifier (SL-P-RNTI), and the SCI is received using the SL-P-RNTI.

12. The operation method according to claim 10, wherein the paging resource region includes a time resource region, the time resource region is indicated by a bitmap or a combination of a start index and number of time resources, and a unit of the time resource is a symbol, slot, subframe, or radio frame.

13. The operation method according to claim 10, wherein the paging resource region includes a frequency resource region, the frequency resource region is indicated by a bitmap or a combination of a start index and number of frequency resources, and a unit of the frequency resource is a subcarrier, physical resource block (PRB), or subchannel.

14. The operation method according to claim 10, wherein the paging resource region is a guard symbol within a slot in which a sidelink-synchronization signal block (S-SSB) is transmitted.

15. The operation method according to claim 10, wherein the paging message includes an identifier of one receiving terminal, an identifier of a group including a plurality of receiving terminals, or an identifier of a zone to which at least one receiving terminal belongs.

16. The operation method according to claim 10, wherein the paging message is received as being included in second-stage SCI or received independently of second-stage SCI.

17. A transmitting terminal in a communication system, the transmitting terminal comprising:
a processor; and
a memory storing one or more instruction executable by the processor,
wherein the one or more instructions are executed to perform:
performing a sensing operation in a paging resource region;
in response to that the paging resource region is available, transmitting sidelink control information (SCI) for scheduling transmission of a paging message to one or more receiving terminals in the paging resource region; and
transmitting the paging message to the one or more receiving terminals using a resource indicated by the SCI.

18. The transmitting terminal according to claim 17, wherein the one or more instructions are further executed to perform: receiving, from a base station, paging configuration information including information indicating the paging resource region, wherein the paging configuration information is included in at least one of system information or a radio resource control (RRC) message.

19. The transmitting terminal according to claim 17, wherein the paging resource region includes a time resource region and a frequency resource region, the time resource region is indicated by a bitmap or a combination of a start index and number of time resources, a unit of the time resource is a symbol, slot, subframe, or radio frame, the frequency resource region is indicated by a bitmap or a combination of a start index and number of frequency resources, and a unit of the frequency resource is a subcarrier, physical resource block (PRB), or subchannel.

20. The transmitting terminal according to claim 17, wherein the paging resource region is a guard symbol within a slot in which a sidelink-synchronization signal block (S-SSB) is transmitted.

* * * * *